Figure 1:
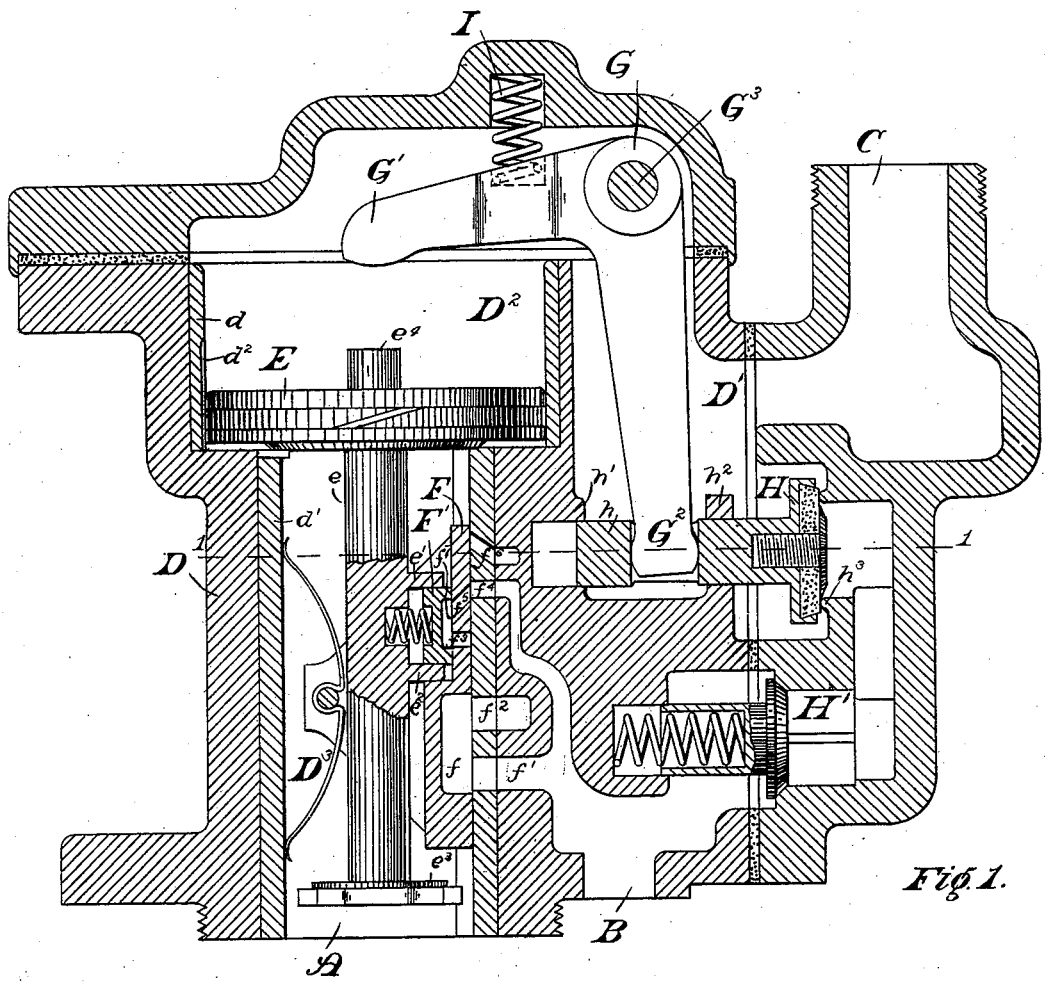

(No Model.)

H. F. NOYES.
AIR BRAKE.

No. 564,389. Patented July 21, 1896.

Witnesses

Inventor
Henry F. Noyes (No Model.)  2 Sheets—Sheet 2.
H. F. NOYES.
AIR BRAKE.
No. 564,389. Patented July 21, 1896.
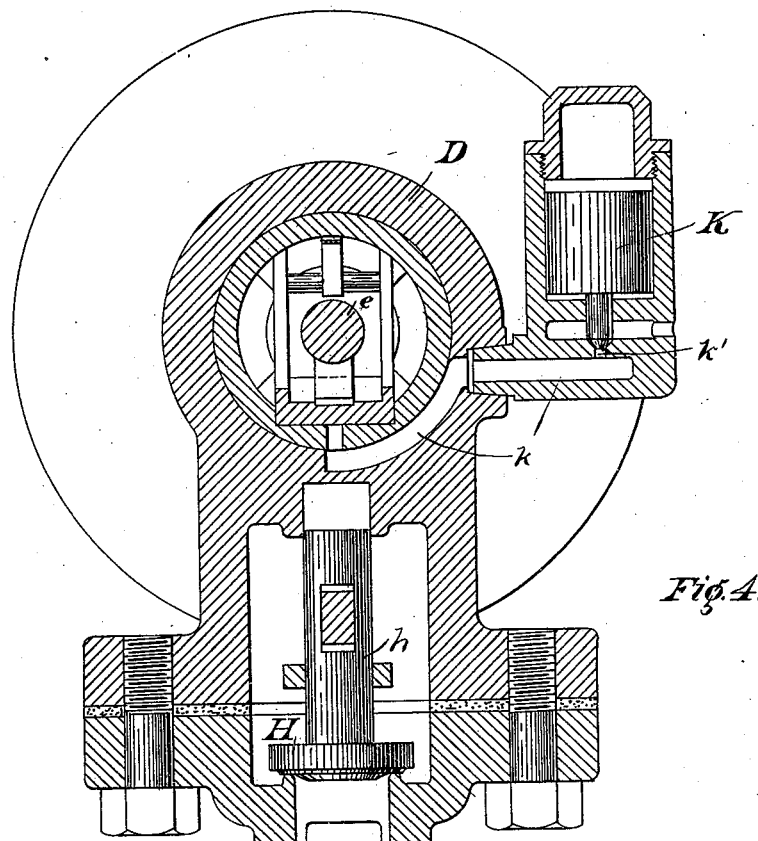
*Fig. 4.*
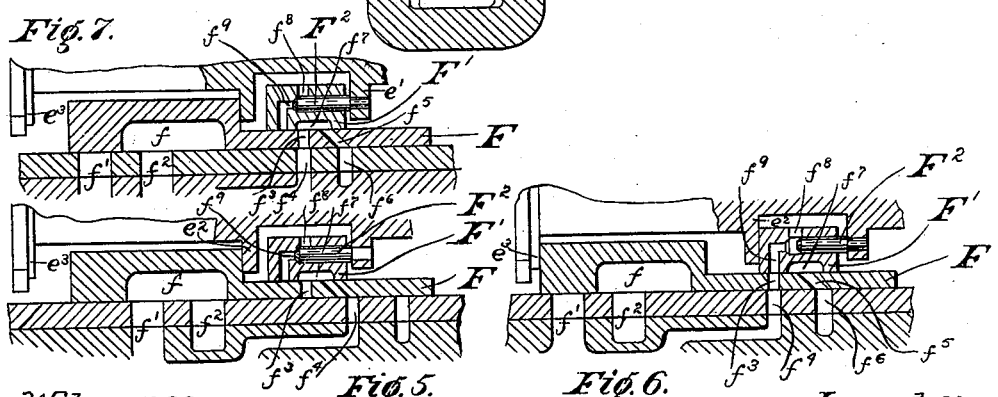
*Fig. 7.*  *Fig. 5.*  *Fig. 6.*
Witnesses
Inventor
Henry F. Noyes

UNITED STATES PATENT OFFICE.

HENRY F. NOYES, OF ELGIN, ILLINOIS.

AIR-BRAKE.

SPECIFICATION forming part of Letters Patent No. 564,389, dated July 21, 1896.

Application filed January 23, 1895. Renewed December 30, 1895. Serial No. 573,835. (No model.)

*To all whom it may concern:*

Be it known that I, HENRY F. NOYES, of Elgin, Kane county, Illinois, have invented certain new and useful Improvements in Air-Brakes, of which the following is a specification.

The object of my invention is to provide a simple, efficient, economical, and automatic pressure-retaining valve combined with a triple valve, especially adapted to be connected with the air-brake system now in use, familiarly known as the "Westinghouse system;" and the invention consists in the features and combinations hereinafter described and claimed.

In the application of the Westinghouse automatic brake as heretofore and at present commonly in use each car is provided with a train-pipe, an auxiliary reservoir, a brake-cylinder, and a triple valve, the triple valve having three connections, to wit, one to the train-pipe, one to the auxiliary reservoir, and one to the brake-cylinder. The train-pipe has a stop-cock at or near each of its ends, to be opened or closed as required, and is fitted with flexible connections and couplings for connecting the pipes from car to car of a train, so as to form a continuous line for the transmission of compressed air from a main reservoir supplied by an air-pump on the engine. When the brakes are off or released, but in readiness for action upon the wheels of the train, the air which fills the train-pipe has a pressure of from sixty-five to seventy-five pounds to the square inch, and by reason of the connections referred to the same pressure is exerted in the casings of the triple valves on both sides of their pistons and in the auxiliary reservoirs connected therewith. At the same time passages called "release-ports" are open from the brake-cylinders to the atmosphere. When it is desired to apply the brakes, a slight reduction of pressure in the train-pipe is made, which acts to admit air-pressure from the auxiliary reservoir to the brake-cylinder sufficient for an ordinary or service stop. For an emergency stop in order to apply the brakes with greater force, a further reduction of pressure in the train-pipe acts to admit air from both the auxiliary reservoir and train-pipe directly to the brake-cylinder. To release the brakes, the train-pipe pressure is raised, which acts to close all communications between the train-pipe, auxiliary reservoir, and brake-cylinder, and to open communication between the brake-cylinder and outer air.

When on a downgrade it is desirable to retain a certain amount of pressure in the brake-cylinder, so that the engineer may keep the train under better control, and not have to continually withdraw pressure from the auxiliary reservoir to keep the desired pressure in the brake-cylinder. At present this pressure is maintained in the brake-cylinder by connecting the exhaust of the triple valve with what is known as a "retaining-valve," located generally at the top of the car, and so arranged as to be within easy reach of the train-hands. Ordinarily this valve is arranged so that the air exhausts directly into the atmosphere; but when it is desired to use this valve to keep a certain amount of air-pressure in the brake-cylinder, the cock is turned so that the air is exhausted through a weighted valve, the weight being of any amount desired, but generally sufficient to retain a pressure of fifteen pounds. As the air exhausts it will raise the retaining-valve and escape until the pressure in the brake-cylinder is reduced to the point of about fifteen pounds, and will maintain that pressure in the brake-cylinder. The objection, however, to this method of maintaining the pressure in the brake-cylinder is that while the engineer is responsible for running his train, he does not have all the parts of the brake mechanism under his absolute control, as he is dependent upon the careful attention of the train-hands, and who must, in conjunction with him, operate this retaining-valve to maintain the desired pressure. Should the train-hands, through carelessness or otherwise, neglect to operate the retaining-valve at the desired time, the liability of causing an accident is magnified, as the engineer has not the full control of his train. To remove these objections, and to provide a suitable valve which will permit the air under pressure in the brake-cylinder to be exhausted into the outer air, either through a free opening or through a retaining-valve which will operate automatically and is at all times under the control of the engineer, is the principal object of my invention.

Figure 2:
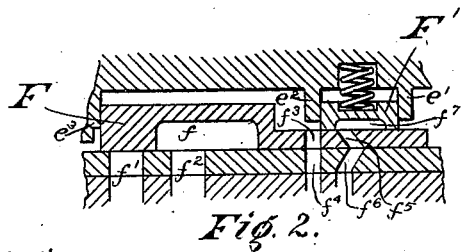
Figure 3:
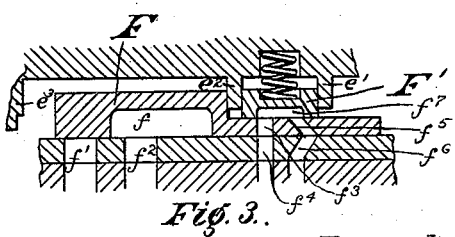

In the accompanying drawings, Figure 1 is a vertical sectional elevation; Fig. 2, a detail of the valves in position, taken during a service application; Fig. 3, a detail of the valves in the position for connecting the brake-cylinder with the retaining-valve; Fig. 4, a section on line 1 1 of Fig. 1; and Figs. 5, 6, and 7, detail views of a slightly different arrangement of the valves and their locations, Fig. 5 for a full release, Fig. 6 for a service-stop, and Fig. 7 for releasing through the retaining-valve.

The triple valve has the same connections as in the present system, A leading to the auxiliary reservoir, B to the brake-cylinder, and C to the train-pipe.

The main casing D has two cylindrical bushings $d$ and $d'$. Working in $d$ is the piston E, and in $d'$ the valves F and F'. The stem $e$ of the piston has the flanges $e'$ and $e^2$ for controlling valve F', and $e^2$ and $e^3$ for valve F. Valve F, through chamber $f$ on its under side, governs ports $f'$ and $f^2$. It also has port $f^3$, adapted to register with $f^4$, and $f^5$ to register with $f^6$. Valve F', through chamber $f^7$ in its under side, governs ports $f^3$ and $f^5$. These ports connect as follows: $f'$ with the brake-cylinder, $f^2$ with the outer air, $f^4$ with the brake-cylinder, and $f^6$ by channel $k$ with the retaining-valve K, which is shown in Fig. 4, and which consists of a weighted valve closing the opening $k'$. Valve F has a certain amount of play between the flanges $e^2$ and $e^3$, allowing the piston-stem and F' a certain range of travel without moving F.

The lever G oscillates on the shaft $G^3$, and has the arms G' and $G^2$. $G^2$ is fitted to a slot in the stem $h$ of the valve H, said valve-stem having bearings $h'$ and $h^2$, and the valve is held to its seat $h^3$ partly by the pressure of the spring I against the other arm of the lever, but chiefly by air-pressure in the chamber D'. The arm G', being in line with stem $e^4$ of the piston, forms a check to it in the latter part of its motion in one direction.

The operation of the mechanism is as follows: Starting with what is known as "running position," the valves being in the position shown in Fig. 1 of the drawings, this being the position they would take after a complete release of the brakes, train-pipe pressure feeds through C, chamber D', past piston E by channel $d^2$, and through chamber $D^3$ to auxiliary reservoir by opening A. For a service-stop, a slight reduction of train-pipe pressure causes the piston to travel forward until the stem $E^4$ strikes against the arm G'. The preponderance of auxiliary-reservoir pressure behind the piston not being sufficient to overcome train-pipe pressure on valve H, further travel of the piston is prevented and the valves are left in the position shown in Fig. 2. Auxiliary-reservoir pressure passes through ports $f^3$ and $f^4$ to the brake-cylinder and applies the brakes. As the air expands into the brake-cylinder the pressure in chamber $D^3$ is reduced until it is slightly lower than that in chamber $D^2$, which causes the piston to return until the lost motion between the flanges $e^2$ and $e^3$ being taken up, further travel of the piston is prevented by the friction of the valve F on its seat, caused by the air-pressure in the chamber $D^3$. The valves are now left in the position shown in Fig. 3, allowing brake-cylinder pressure to pass through ports $f^4$, $f^3$, $f^7$, $f^5$, and $f^6$ and channel $k$ to retaining-valve K, and lifting the latter to escape to the atmosphere until the pressure in the brake-cylinder is reduced to about fifteen pounds per square inch, when valve K closes and prevents further escape of pressure. If this application is not sufficient to check the train as much as desired, another slight reduction in train-pipe pressure causes the piston to again move forward and admit further pressure from the auxiliary reservoir to the brake-cylinder; and this operation can be repeated until the auxiliary-reservoir pressure has been lowered by expansion into the brake-cylinder to a degree about equal to that of the train-pipe pressure in the chamber $D^2$, when the piston and valves remain in the position shown in Fig. 2. If now it is again desired to use the retaining-valve, the train-pipe pressure is raised slightly, causing the piston and valves to return to position shown in Fig. 3, when friction of valve F on its seat prevents further travel. To obtain a complete release of the brakes, the train-pipe pressure is raised a greater amount, which drives the piston back and with it the valves until they take the position shown in Fig. 1, when all pressure in the brake-cylinder passes to the atmosphere through ports $f'$, $f$, and $f^2$. For an emergency-stop, a reduction of train-pipe pressure of ten or twelve pounds causes the piston to travel forward, and when the stem $e^4$ strikes the arm G' the preponderance of pressure in chamber $D^3$ is sufficient to cause the piston to overcome the train-pipe pressure on the valve H, and, raising the valve H, allows train-pipe pressure by lifting check-valve H' to rush directly to the brake-cylinder. At the same time the piston has moved far enough to open port $f'$ to auxiliary-reservoir pressure, which thus mingles with train-pipe pressure and applies the brakes more powerfully. A release is obtained as in a service-stop.

In Figs. 5, 6, and 7 I have shown an additional valve $F^2$. In this arrangement valve F' has a slight range of motion between the flanges $e'$ and $e^2$. The valve $F^2$, being connected to the flange $e'$ of the piston-stem, moves with the latter, and is provided with a seat $f^9$ in the valve F', so that the lost motion of the valve F' between the flanges of the piston-stem is sufficient to allow the valve $F^2$ to open or close the port $f^8$. The object of this arrangement is to insure a more prompt closing of the ports connecting the auxiliary reservoir and brake-cylinder, as in the arrangement shown in Fig. 1, &c. The air-pressure on valve F' causes considerable friction of valve F' upon its seat, and the difference of pressure on each side of the piston in the chambers D² and D³ must be sufficient to overcome this friction, while in the arrangement shown in Figs. 5, 6, and 7 this friction is done away with, as the port $f^8$ is closed by valve F² without moving valve F'. The operation is similar to that of the arrangement in Fig. 1, and the different locations of the valves correspond—Fig. 1 with Fig. 5, Fig. 2 with Fig. 6, and Fig. 3 with Fig. 7.

From the above description it will be seen that the advantages of my improvement are that the engineer, through his engineer's valve, may always have the entire train under his control, being able to obtain either a full release or to retain a slight pressure in the brake-cylinder whenever desired. Thus instead of having several persons responsible for the safe operation of the brakes, it is under one responsible head, and generally a man skilled in the use of such mechanisms, so that it may safely be left to his control.

Another advantage of this invention is that during service applications of the brakes it lessens the danger of sliding the wheels on the rails, since, it being a well-known fact that the brakes can be applied with a greater power without sliding the wheels when at a higher speed, it is evident that with this device the brakes are applied with a maximum power at first, when the speed is greatest, and then the power with which they are applied is gradually decreased as the pressure is gradually released from the brake-cylinder down to a certain amount which is retained in the brake-cylinder.

While I have described my invention with considerable minuteness as regards the details thereof, and as being embodied in more or less precise form, I do not desire to be limited thereto unduly, as I contemplate all proper changes in form, omissions of parts, and the substitution of equivalents, as circumstances may suggest or necessity render expedient.

I claim—

1. In a brake mechanism, the combination of a brake-cylinder an auxiliary reservoir, and a train-pipe with a triple valve provided with a pressure-retaining valve, an exhaust-port independent of the retaining-valve, and an auxiliary valve operated by the triple-valve mechanism to control the escape of fluid-pressure from the brake-cylinder to the retaining-valve, substantially as described.

2. The combination of an air-brake system provided with a source of air-pressure, an engineer's valve, a brake-cylinder an auxiliary reservoir and a train-pipe, with a triple valve provided with a pressure-retaining valve and with valves actuated by the piston of the triple valve to direct the escape of fluid-pressure from the brake-cylinder either directly to the atmosphere or to the retaining-valve, substantially as described.

3. In a brake mechanism, the combination of a brake-cylinder an auxiliary reservoir and a train-pipe with a triple valve provided with a pressure-retaining valve, an exhaust-port independent of the retaining-valve, a main valve and an auxiliary valve actuated by the triple-valve piston to control in conjunction with the main valve the escape of fluid-pressure from the cylinder to the retaining-valve, substantially as described.

4. The combination in a triple-valve device, of a pressure-retaining valve, a piston provided with a stem, a main valve governed by the piston-stem but having a short range of motion independent of it, an auxiliary valve actuated by the piston-stem to control communication between passages leading to connections with a brake-cylinder and the retaining-valve, without necessarily moving the main valve substantially as described.

5. The combination of an air-brake system, provided with a source of air-pressure, an engineer's valve, a brake-cylinder, an auxiliary reservoir, and a train-pipe, with a triple valve provided with a retaining-valve and with a piston whose preliminary traverse in the direction required to release the brakes allows all but a predetermined amount of fluid-pressure to escape from the brake-cylinder, and whose further traverse in the same direction allows all fluid-pressure to escape from the brake-cylinder, substantially as described.

6. The combination of an air-brake system, provided with a source of air-pressure, an engineer's valve, an auxiliary reservoir, and a train-pipe, with a triple valve provided with a retaining-valve and a piston whose traverse in the direction required to apply the brakes admits fluid-pressure from the auxiliary reservoir to the brake-cylinder, whose preliminary traverse in the direction required to release the brakes allows all but a predetermined amount of fluid-pressure to escape from the brake-cylinder, and whose further traverse in the latter direction allows all fluid-pressure to escape from the brake-cylinder, substantially as described.

7. The combination of an air-brake system provided with a source of air-pressure, an engineer's valve, a brake-cylinder, an auxiliary reservoir, and a train-pipe, with a triple valve provided with a retaining-valve and a piston whose preliminary traverse in the direction required to apply the brakes admits fluid-pressure from the auxiliary reservoir to the brake-cylinder whose further traverse in such direction admits fluid-pressure directly from the train-pipe to the brake-cylinder, and effects a second admission of fluid-pressure from the auxiliary reservoir to the brake-cylinder, whose preliminary traverse in the direction required to release the brakes allows all but a predetermined amount of fluid-pressure to escape from the brake-cylinder, and whose traverse in the latter direction allows all fluid-pressure to escape from the brake-cylinder, substantially as described.

8. The combination of an air-brake system provided with a source of air-pressure, an engineer's valve, a brake-cylinder, an auxiliary reservoir, and a train-pipe, with a triple valve provided with a retaining-valve and a piston which is actuated by a preliminary reduction of fluid-pressure in the train-pipe to admit fluid-pressure from the auxiliary reservoir to the brake-cylinder, which is actuated by a greater reduction of pressure in the train-pipe to admit fluid-pressure from both the auxiliary reservoir and train-pipe directly to the brake-cylinder, which is actuated by preliminary increase of fluid-pressure in the train-pipe to permit all but a predetermined amount of fluid-pressure to escape from the brake-cylinder, and which is actuated by a greater increase of fluid-pressure in the train-pipe to permit all fluid-pressure to escape from the brake-cylinder, substantially as described.

9. The combination of an air-brake system provided with a source of air-pressure, an engineer's valve, a brake-cylinder, an auxiliary reservoir and a train-pipe, with a triple valve provided with a pressure-retaining valve, an exhaust-port independent of the retaining-valve and a piston actuated, by the expansion of the fluid-pressure from the auxiliary reservoir into the brake-cylinder until it becomes less than the fluid-pressure in the train-pipe, to admit fluid-pressure from the brake-cylinder to the retaining-valve, substantially as described.

10. The combination of an air-brake system provided with a source of air-pressure, an engineer's valve, a brake-cylinder, an auxiliary reservoir and a train-pipe, with a triple valve provided with a pressure-retaining valve, an exhaust-port independent of the retaining-valve and a piston actuated, by the expansion of the fluid-pressure from the auxiliary reservoir into the brake-cylinder until it becomes less than the fluid-pressure in the train-pipe, to prevent the further escape of fluid-pressure from the auxiliary reservoir to the brake-cylinder, and to admit fluid-pressure from the brake-cylinder to the retaining-valve, substantially as described.

11. The combination, in a triple-valve device, of a pressure-retaining valve a piston provided with a stem, a main valve governed by the piston-stem but having a short range of motion independent of it, an auxiliary valve or valves adapted to control communication between passages leading to connections with a brake-cylinder and the retaining-valve, and with an auxiliary reservoir and a brake-cylinder respectively, without necessarily moving the main valve, substantially as described.

12. The combination, in a triple-valve device, of a pressure-retaining valve, a piston provided with a stem, a main valve governed by the piston-stem but having a short range of motion independent of it, two auxiliary valves, one adapted to control communication between passages leading to connections with an auxiliary reservoir and a brake-cylinder, without necessarily moving the main or other auxiliary valve substantially as described.

13. The combination, in a triple-valve device, of a casing, a piston fixed upon a stem and working in a chamber therein, a main valve, governed by the piston-stem and having a short range of motion independent of it, said main valve controlling communication between passages leading to connections with a brake-cylinder and the atmosphere, an auxiliary valve or valves moving with the piston-stem and in conjunction with the main valve controlling communication between passages leading to connections with an auxiliary reservoir and a brake-cylinder, and with a brake-cylinder and a pressure-retaining valve respectively, substantially as described.

14. The combination, in a triple-valve device, of a casing, a piston fixed upon a stem and working in a chamber therein, a main valve governed by the piston-stem and having a short range of motion independent of it, said main valve controlling communication between passages leading to connections with a brake-cylinder and the atmosphere, an auxiliary valve or valves moving with the piston-stem and in conjunction with the main valve controlling communication between passages leading to connections to an auxiliary reservoir and a brake-cylinder, and to a brake-cylinder and a pressure-retaining valve, respectively, a lever actuated by the piston-stem to control communications between passages leading to direct connections with the train-pipe and brake-cylinder, substantially as described.

15. The combination, in a triple-valve device, of a casing, a piston fixed upon a stem and working in a chamber therein, a main valve governed by the piston-stem and having a short range of motion independent of it, said main valve controlling communication between passages leading to connections with a brake-cylinder and the atmosphere, an auxiliary valve or valves moving with the piston-stem and in conjunction with the main valve controlling communication between passages leading to connections to an auxiliary reservoir and a brake-cylinder and to a brake-cylinder and a pressure-retaining valve, respectively, a lever actuated by the piston-stem to control an emergency-valve governing the passage leading to direct communication with the train-pipe and brake-cylinder, a check or non-return valve interposed in the passage leading from such emergency-valve to the brake-cylinder, substantially as described.

HENRY F. NOYES.

Witnesses:
GEORGE F. NAYLOR,
JOHN W. FARNUM.